United States Patent [19]

Roh

[11] Patent Number: 5,402,586
[45] Date of Patent: Apr. 4, 1995

[54] DEVICE FOR CONTROLLING DRYING PERIOD OF TIME IN A WASHING MACHINE

[75] Inventor: Young H. Roh, Seoul, Rep. of Korea

[73] Assignee: Goldstar Co., Ltd., Seoul, Rep. of Korea

[21] Appl. No.: 170,952

[22] Filed: Dec. 21, 1993

[30] Foreign Application Priority Data

Dec. 21, 1992 [KR] Rep. of Korea ............... 1992-26005

[51] Int. Cl.⁶ .............................................. F26B 19/00
[52] U.S. Cl. .................................... 34/562; 34/596;
34/572; 68/208; 68/12.02; 68/12.14
[58] Field of Search ................ 34/58, 312, 318, 319,
34/498, 499, 572, 595, 596, 562; 68/208, 12.02,
12.14

[56] References Cited

U.S. PATENT DOCUMENTS 3,707,856  1/1973  Niewyk et al. ................ 68/208
5,042,276  8/1991  Kamano et al. ................ 68/12.14

FOREIGN PATENT DOCUMENTS 2399019  2/1979  France ........................... 34/572
2052709  1/1981  United Kingdom ........... 34/572

Primary Examiner—Denise L. Gromada
Attorney, Agent, or Firm—Morgan & Finnegan

[57] ABSTRACT

A device for controlling a drying period of time in a washing machine which can control drying of laundry with an optimum period of time, comprises a non-conductive pipe arranged to drain water extracted from laundry well, a transmission voltage generating part, mounted inside of the non-conductive pipe, for generating a transmission voltage corresponding to the quantity of the draining water, a comparing part for comparing the transmission voltage with a predetermined reference voltage to generate a compared signal, and a microcomputer for controlling a motor for drying operation in response to the compared signal.

6 Claims, 2 Drawing Sheets 92 or 93

DEVICE FOR CONTROLLING DRYING PERIOD OF TIME IN A WASHING MACHINE

FIELD OF THE INVENTION

This invention relates to a controlling of a drying period of time of a washing machine, more particularly to a device for controlling a drying period of time in a washing machine which can control drying of laundry with an optimum period of time.

BACKGROUND OF THE INVENTION

In general, drying period of time is determined according to the quantity of either laundry or washing water in a washing tub.

During the drying period of time determined as above, drying is proceeded by rotating a drying tub.

In case the drying period of time is controlled by the quantity of laundry, the quantity of laundry in the washing tub is detected followed by presetting of an appropriate washing water level, washing period of time and drying period of time according to the detected quantity of laundry. Washing is carried out by pulsating washing water with a washing motor for the preset period of washing time, and, on finish of washing, drying is proceeded by rotating the drying tub for the preset drying period of time.

To detect the quantity of laundry in the washing tub, power supply to the washing motor is cut-off after running the washing motor for a certain period of time. When power supply to the washing motor is cut-off, the washing motor does not stop at once but slows down by the inertia until it comes to a complete stop. The washing motor stops earlier when there is more laundry due to the friction between laundry and a pulsator. Number of waves of remaining voltage generated by the inertia of the washing motor is detected so as to determine the quantity of laundry in accordance with the number of waves transmitted. Based on this determination, presettings of the washing water level, the washing period of time and the drying period of time are carried out.

However, because the presettings of the washing and the drying period of time only through the detection of quantity of laundry is not sufficient enough, an adjustment of the drying period of time according to the kind of laundry is carried out. As the judgement on the kind of laundry by users may not be precise in most cases, it has been a problem that the unrequired drying time was wasted accordingly. Particularly, the drying period of time for laundry of easy drying can, most probably, be preset longer than required.

Further, the determination of the quantity of laundry in the washing machine has to be carried out in comparison with the data memory which is obtained through experiments of drying period of time according to the quantity of laundry, of which setting of experimental criteria and exact calculation of data are not simple, and production cost is high due to the great number of memory.

On the other hand, in case the drying period of time is controlled by the quantity of washing water, the washing water in a drying tub is passed with light, with which quantity of passed light the drying period of time is preset.

However, this technology also has problems that, because the drying period of time is controlled, not taking into account of the quantity and kind of laundry, but comparing the passed quantity of light with a certain criteria, an excessive drying over the appropriate drying period of time, occurs when the quantity of laundry is much, and an appropriate presetting of drying period of time can not be obtained when the quantity of laundry is small because the period of time reaching to a certain criteria is too fast. Moreover, as the degree of water soaking and draining to/from laundry is different depending on the kind of laundry, there has been a problem that the most suitable control of drying period of time is hard to obtain with this type of control.

SUMMARY OF THE INVENTION

The object of this invention is to provide a device for controlling a drying period of time in a washing machine which can detect an optimum drying operation finish time.

This and other objects and the features of this invention can be achieved by providing a device for controlling a drying period of time in a washing machine which can control drying of laundry with an optimum period of time, comprises a non-conductive pipe arranged to drain water extracted from laundry well, a transmission voltage generating part, mounted inside of the non-conductive pipe, for generating a transmission voltage corresponding to the quantity of the draining water, a comparing part for comparing the transmission voltage with a predetermined reference voltage to generate a compared signal, and a microcomputer for controlling a motor for drying operation in response to the compared signal.

DETAILED DESCRIPTION OF THE INVENTION

Figure 1:
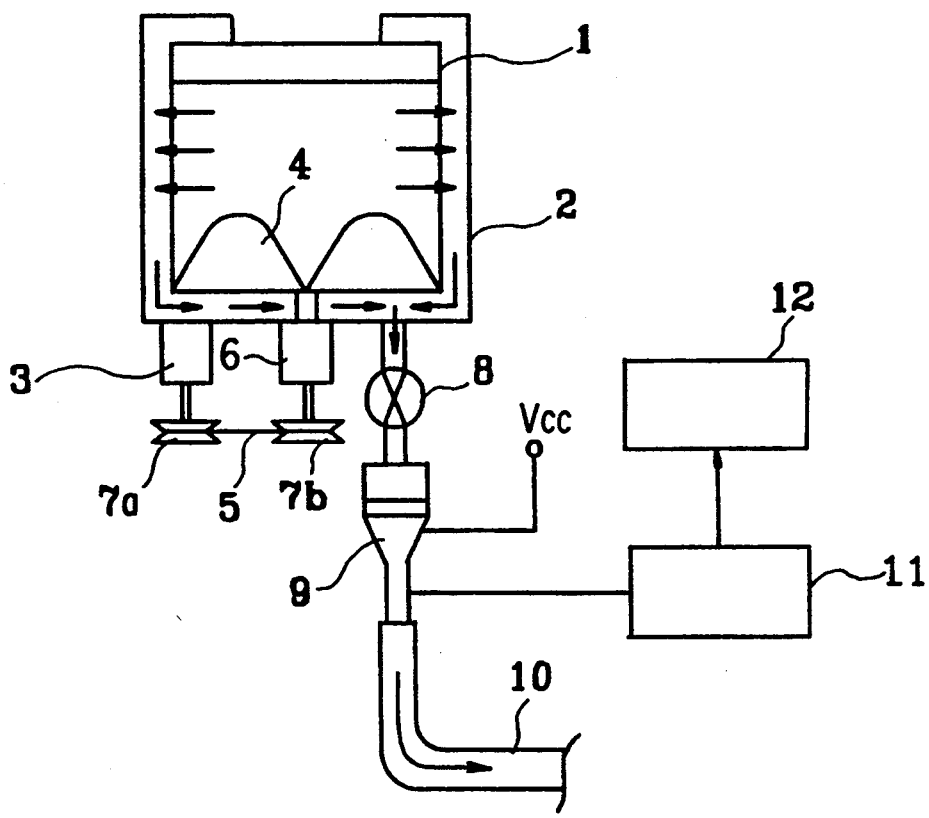
FIG. 1 shows the layout of a device for controlling a drying period of time in a washing machine according to this invention.

FIG. 1 shows the layout of a device for controlling a drying period of time in a washing machine according to this invention which includes a motor 3 mounted on under side of a washing tub 2 generating operation power, a clutch 6 regulating the operation power generated in the motor 3, a pulsator 4 rotated by the power transmitted through the clutch 6 to pulsate washing water, a drying tub 1 mounted in the washing tub 2 and rotated by the power transmitted through the clutch 6, a drain valve 8 for regulating drain of washing water or extracted water, a water quantity detector 9 provided between the drain valve 8 and a drain hose 10 electrically connected through the drain water flowing through the drain valve 8 for generating the transmission voltage, a comparing part 11 comparing the transmission voltage of the water quantity detector 9 with a preset voltage to generate a compared signal, and a microcomputer 12 controlling the operation of the motor 3 in response to the compared signal of the comparing part.

The un-explained number 5 is a belt, 7a is a motor pulley, and 7b is a clutch pulley.

Figure 2:
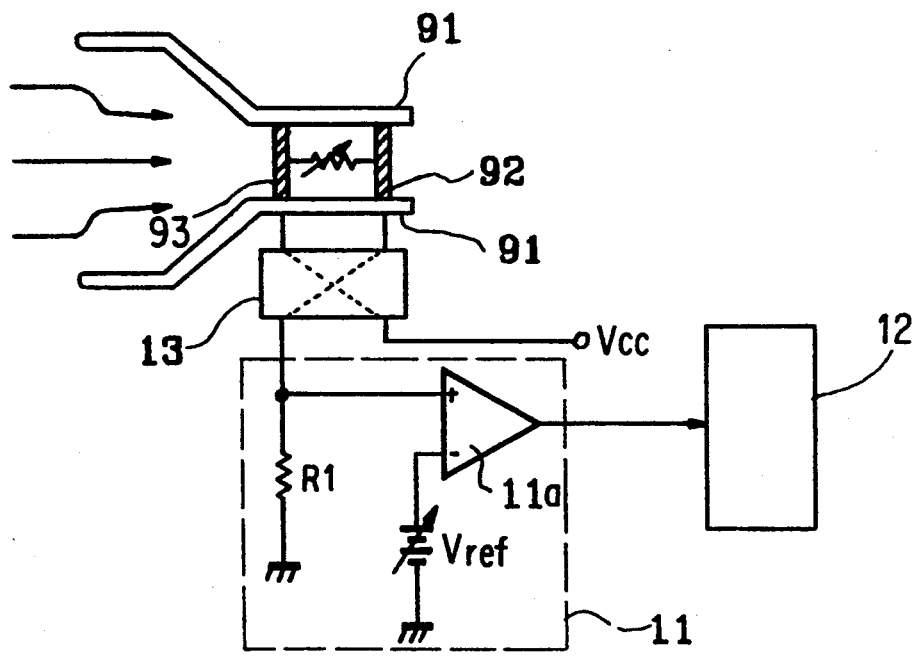
FIG. 2 shows the details of the water quantity detector and the comparing part of FIG. 1.

FIG. 2 shows the details of the water quantity detector 9 and the comparing part 11 of FIG. 1, wherein the water quantity detector 9 includes a cylindrical non conductive pipe 91 mounted in a certain angle, preferably in perpendicular for smooth flow of water, and one pair of poles 92 and 93 installed with a certain distance between them in the direction of water flow.

The un-explained number 13 is a switch for changing the polarity of the one pair of poles 92 and 93 in the water quantity detector 9.

Figure 3:
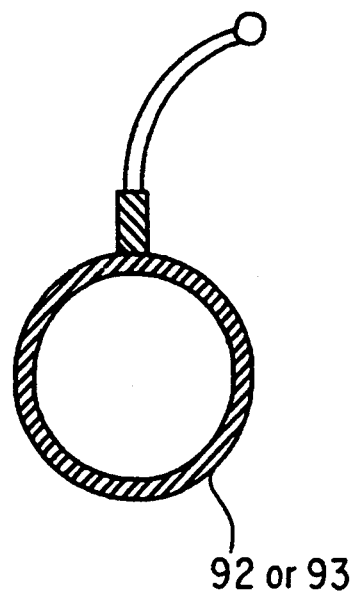
FIG. 3 is a annular electric pole in a water quantity detector in accordance with one embodiment of this invention.

The pole 92 is applied with supply power Vcc, and the pole 93 is connected with the comparing part 11. Though these poles 92 and 93 have an annular shape corresponding to the non-conductive pipe 91 in this embodiment as shown in FIG. 3, it is, of course, possible to have another shapes.

The comparing part 11 includes a comparator 11a of which non inversion terminal(+) is applied with the transmission voltage between the poles 92 and 93, and inversion terminal(−) is applied with a reference voltage Vref. The un-explained symbol R1 is a resistance for the detection of the transmission voltage.

When a washing program is set by pressing keys, a feed water valve is opened to feed water into the washing tub 2 to an appropriate level. Washing water level and washing period of time are set with the technology of detecting the quantity of laundry explained before. Washing water is fed into the washing tub 2 through the feed water valve up to the preset level to carry out washing for the preset washing period of time.

On completion of washing, drying operation is carried out, when the microcomputer 12 controls the drying tub 1 to rotate in high speed through the motor 3, the V-Belt 5 and the clutch 6.

When the drying tub 1 is rotated in a high speed, water extracted from laundry is ejected through the holes in the washing tub 1 and drained through the drain valve 8, the water quantity detector 9 and drain hose 10 after stored in the washing tub 2. When the extracted water is passing the poles 92 and 93 of the water quantity detector 9, a current is established between the poles 92 and 93 transmitted through the draining water, and the established current breaks when drying operation is finished as no water to transmit the current exists.

Figure 4:
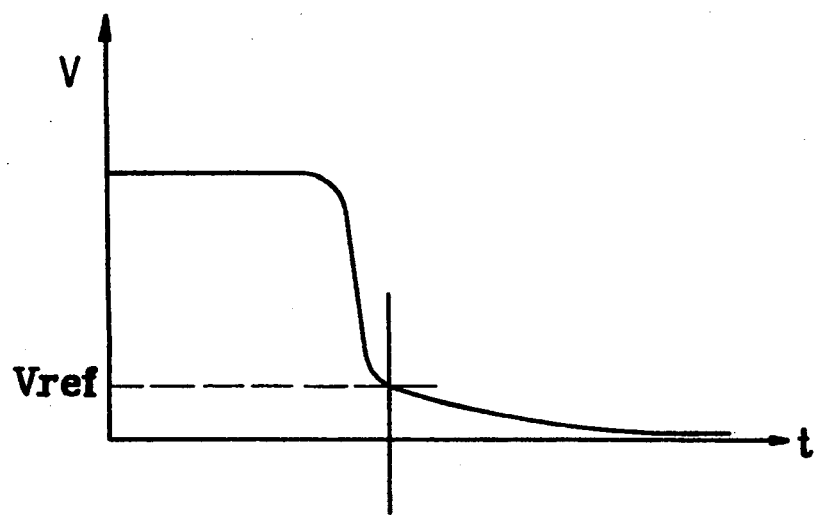
FIG. 4 is a characteristic curve of a transmission voltage of a water quantity detector in accordance with this invention.

The operation of the water quantity detector 9 is to be explained in detail referring to FIG. 4 showing the changes of the transmission voltage. When the water having passed through the drain valve 8 comes to the non conductive pipe 91 of the water quantity detector 9 and passes through between the two poles 92 and 93, the resistance between the two poles 92 and 93 becomes to the minimum due to the large quantity of water flowing therethrough, so that the transmission voltage on the resistance R1 becomes to the maximum.

On continuation of drying operation, the water flowing between the two poles 92 and 93 will decrease until no water flows between them, when the resistance between the two poles 92 and 93 become infinite, so that the transmission voltage on the resistance R1 becomes to minimum. Specially, when the poles are formed in annular shape, the detection still possible even if there is small amount of residue of drying water.

In the meantime, ions attached on the two poles 92 and 93 produced by electrolysis of water and impurities impairs transmission of the current between the two poles 92 and 93, for prevention of which, the polarity of the two poles 92 and 93 are changed periodically by a switch 13.

When the quantity of the water decreases to a certain degree, the area of the inside surface of the non conductive pipe 91 on which the water flowing down wetting the surface will decrease making the transmission voltage on the resistance R1 applied through the poles 92 and 93 to decrease too.

Accordingly, the comparator 11a transmits a high signal when the transmission voltage is higher than the reference voltage Vref., and a low signal when the transmission voltage is lower than the reference voltage Vref, to the microcomputer 12 after comparison of the transmission voltage with the reference voltage. The microcomputer 12 controls to keep on drying operation on high signal input thereto, and to stop the motor 3 on low signal input thereto to end drying operation judging that drying has been completed.

As explained above, this invention allows the optimum control of drying period of time of laundry, and prevent an unnecessary drying period of time and malfunction. Moreover, because what is required to memorize in the microcomputer is, not the data of drying period of time depending on the kinds of laundry, but just the preset value of the degree of drying time, the capacity of the memory and the data of drying period of time in the microcomputer can be decreased much resulting to allow a large cut down of the production cost.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is;

1. A device for controlling drying period of time in a washing machine comprising;
    a non-conductive pipe arranged to drain water extracted from laundry well;
    transmission voltage generating means, mounted inside of said non-conductive pipe, for generating a transmission voltage corresponding to the quantity of the draining water;
    comparing means for comparing the transmission voltage with a predetermined reference voltage to generate a compared signal; and
    a microcomputer for controlling a motor for drying operation in response to the compared signal.

2. A device as claimed in claim 1, wherein the non-conductive pipe is arranged in perpendicular position.

3. A device as claimed in claim 1, wherein said transmission voltage generating means includes a first pole and second pole, arranged to have a certain distance between them in said non-conductive pipe, for communicating with each other through the draining water; a power supply source connected to the first pole; and transmission voltage detection means for detecting the transmission voltage between the first pole and the second pole, one end of the transmission voltage detection means being connected to the second pole and the other end of the transmission voltage detection means being grounded.

4. A device as claimed in claim 3, wherein the voltage detection means is a resistance element.

5. A device as claimed in claim 3, wherein the first pole and the second pole have an annular shape corresponding to said non-conductive pipe.

6. A device as claimed in claim 3, further comprising switching means for exchanging the polarity of the first pole and the second pole periodically.

* * * * *